US009540285B2

(12) United States Patent
Ohta et al.

(10) Patent No.: US 9,540,285 B2
(45) Date of Patent: Jan. 10, 2017

(54) GRAPHITE FILM AND PROCESS FOR PRODUCING GRAPHITE FILM

(75) Inventors: Yusuke Ohta, Osaka (JP); Takashi Inada, Osaka (JP); Makoto Mishiro, Osaka (JP); Yasushi Nishikawa, Osaka (JP)

(73) Assignee: KANEKA CORPORATION, Osaka (JP)

( * ) Notice: Subject to any disclaimer, the term of this patent is extended or adjusted under 35 U.S.C. 154(b) by 148 days.

(21) Appl. No.: 13/818,400

(22) PCT Filed: Aug. 19, 2011

(86) PCT No.: PCT/JP2011/068802
§ 371 (c)(1),
(2), (4) Date: Feb. 22, 2013

(87) PCT Pub. No.: WO2012/026408
PCT Pub. Date: Mar. 1, 2012

(65) Prior Publication Data
US 2013/0164210 A1 Jun. 27, 2013

(30) Foreign Application Priority Data

Aug. 25, 2010 (JP) ................. 2010-188608

(51) Int. Cl.
*C01B 31/04* (2006.01)
*C04B 35/634* (2006.01)
(Continued)

(52) U.S. Cl.
CPC ......... *C04B 35/63444* (2013.01); *C01B 31/04* (2013.01); *C04B 35/522* (2013.01);
(Continued)

(58) Field of Classification Search
CPC .... C01B 31/04; C08L 77/06; C04B 35/63444; C04B 35/524; C04B 35/62218; C04B 35/522
(Continued)

(56) References Cited

U.S. PATENT DOCUMENTS 5,091,025 A 2/1992 Murakami et al.
5,352,524 A * 10/1994 Nagata ..................... 428/408
(Continued)

FOREIGN PATENT DOCUMENTS

CN 1427021 7/2003
CN 101027345 8/2007
(Continued)

OTHER PUBLICATIONS

Takeichi, et al. Carbonization and Graphitization of Polyimide Films: Polyamide Acid Methyl Ester of PMDA/PDA as a Precursor. Journal of Applied Polymer Science 1996; 61: 1571-1578.*
(Continued)

*Primary Examiner* — Daniel C McCracken
(74) *Attorney, Agent, or Firm* — Kagan Binder, PLLC

(57) ABSTRACT

A graphite film which is low in graphite dust generation can be produced by properly selecting acid dianhydride and diamine which constitute a polyimide film, which polyimide film is a raw material of the graphite film. Specifically, the graphite film which is low in graphite dust generation can be obtained if (1) the acid dianhydride is PMDA and the diamine has a molar ratio of ODA/PDA in a range of 100:0 to 80:20, or (2) the acid dianhydride has a molar ratio of PMDA/BPDA in a range of 80:20 to 50:50, and the diamine has a molar ratio of ODA/PDA in a range of 30:70 to 90:10.

4 Claims, 4 Drawing Sheets

(51) Int. Cl.
*C08L 77/06* (2006.01)
*C04B 35/52* (2006.01)
*C04B 35/524* (2006.01)
*C04B 35/622* (2006.01)

(52) U.S. Cl.
CPC ...... *C04B 35/524* (2013.01); *C04B 35/62218* (2013.01); *C08L 77/06* (2013.01)

(58) Field of Classification Search
USPC .......................................................... 423/448
See application file for complete search history.

(56) References Cited

U.S. PATENT DOCUMENTS

| | | |
|---|---|---|
| 6,335,416 B1 | 1/2002 | Nojiri et al. |
| 2003/0144461 A1 | 7/2003 | Fujihara et al. |
| 2008/0014426 A1* | 1/2008 | Nishikawa et al. .......... 428/220 |
| 2009/0056981 A1 | 3/2009 | Maeda et al. |
| 2009/0197110 A1* | 8/2009 | Kikuchi et al. ............... 428/626 |
| 2010/0062220 A1* | 3/2010 | Nishikawa .................... 428/156 |

FOREIGN PATENT DOCUMENTS

| | | |
|---|---|---|
| CN | 101193750 | 6/2008 |
| JP | 3-75211 | 3/1991 |
| JP | 2004-017504 | 1/2004 |
| JP | 2006-306067 | 11/2006 |
| JP | 2010-042959 | 2/2010 |
| JP | 2010-215441 | 9/2010 |
| TW | 531547 | 5/2003 |

OTHER PUBLICATIONS

Brust, "Polyimides," 2005 Polymer Science Learning Center, Department of Polymer Science, The University of Southern Mississippi, accessed online at http://www.pslc.ws/macrog/imide.htm on Nov. 19, 2014.*
Patent Assignment 502239819 Reel: 029856 Frame: 0979 dated Feb. 22, 2013.*
English Translation of PCT International Preliminary Report on Patentability, International Application No. PCT/JP2011/068802, mailed Mar. 28, 2013.
International Search Report, International Application No. PCT/JP2011/068802, mailed Nov. 29, 2011, with English Translation, 2 pgs.

* cited by examiner 31
32

TD DIRECTION

MD DIRECTION 81          82          83          84

GRAPHITE FILM AND PROCESS FOR PRODUCING GRAPHITE FILM

TECHNICAL FIELD

The present invention relates to a graphite film and a process for producing the same.

BACKGROUND ART

Graphite films are used as heat-radiating components for semiconductor elements or other heat-generating components provided in a variety of electronics and electric devices such as computers. A graphite film having an excellent mechanical strength and flexibility as shown in FIG. 1 is obtained as follows (Patent Literature 1). A polymer film having a thickness of 75 μm is heated up to a temperature of 1,000° C. in a nitrogen gas so as to obtain a carbonized film. The carbonized film thus obtained is heated up to 3,000° C. in an argon atmosphere so as to obtain a graphitized film. The graphitized film thus obtained is subjected to a rolling treatment, thereby obtaining the graphite film.

CITATION LIST

Patent Literature

Patent Literature 1
Japanese Patent Application Publication, Tokukaihei No. 3-75211A (1991)

SUMMARY OF INVENTION

Technical Problem

When a graphite film is used, for example, in electronics, graphite dust generated from the graphite film contaminates an inside of the electronics, and becomes a cause of a short circuit. This has been a problem to be solved.

Solution to Problem

Therefore, the present invention includes the following inventions.

(1) A graphite film made from a polyimide film as a raw material, the polyimide film being obtainable by causing a reaction with acid dianhydride and diamine, the acid dianhydride having a molar ratio of PMDA/BPDA in a range of 80:20 to 50:50, the diamine having a molar ratio of ODA/PDA in a range of 30:70 to 90:10.

(2) The graphite film according to (1), wherein the acid dianhydride has the molar ratio of PMDA/BPDA in a range of 70:30 to 60:40 and the diamine has the molar ratio of ODA/PDA in a range of 40:60 to 85:15.

(3) A process for producing a graphite film, the process including: carrying out a thermal treatment on a polyimide film at a temperature equal to or more than 2,600° C., the polyimide film having been obtained by causing a reaction with acid dianhydride (1) and diamine (2), the acid dianhydride (1) having a molar ratio of PMDA/BPDA in a range of 80:20 to 50:50, the diamine (2) having a molar ratio of ODA/PDA in a range of 30:70 to 90:10.

(4) The process according to (3), wherein the polyimide film has been obtained by causing a reaction with the acid dianhydride (1) and the diamine (2), the acid dianhydride (1) having the molar ratio of PMDA/BPDA in a range of 70:30 to 60:40, the diamine having the molar ratio of ODA/PDA in a range of 40:60 to 85:15.

(5) A graphite film made from a polyimide film as a raw material, the polyimide film being obtainable by causing a reaction with acid dianhydride and diamine, the acid dianhydride being PMDA, the diamine having a molar ratio of ODA/PDA in a range of 100:0 to 80:20.

(6) A process for producing a graphite film, the process including: carrying out a thermal treatment on a polyimide film at a temperature equal to or more than 2,600° C., the polyimide film having been obtained by causing a reaction with acid dianhydride (1) and diamine (2), the acid dianhydride (1) being PMDA, the diamine (2) having a molar ratio of ODA/PDA in a range of 100:0 to 80:20.

(7) The graphite film according to (1), (2) or (5), wherein a thickness of the polyimide film is in a range of 5 μm to 125 μm.

(8) The graphite film according to any one of (1), (2), (5), or (7), wherein a thickness of the graphite film is in a range of 5 μm to 300 μm.

(9) The graphite film according to any one of (1), (2), (5), (7), or (8) wherein, if (i) the graphite film is cut into 30 mm square, on which a 50 mm-square polyimide film is stacked, (ii) the graphite film obtained in (i) is subjected to pressure bonding with the polyimide film by being pressed, on a flat pedestal, with a roller of 2 kg by weight which is defined in ISO/DIS 2411, (iii) the graphite film is then separated from the polyimide film, the polyimide film has less than 3 graphite dust particles being 0.1 mm or greater in major axis.

(10) The graphite film according to any one of (1), (2), (5), (7), (8), or (9) wherein the graphite film is flexable by 5,000 times or more in MIT folding endurance test.

(11) The process according to (3), (4) or (6) wherein a thickness of the polyimide film is in a range of 5 μm to 125 μm.

Advantageous Effects of Invention

This invention makes it possible to produce a graphite film which is low in graphite dust generation.

Other purposes, features, and excellences of the present invention will be fully understood via the following description. Further, advantages of the present invention will be understood by the following explanation which is made with reference to the accompanying drawings.

DESCRIPTION OF EMBODIMENTS

Figure 1:
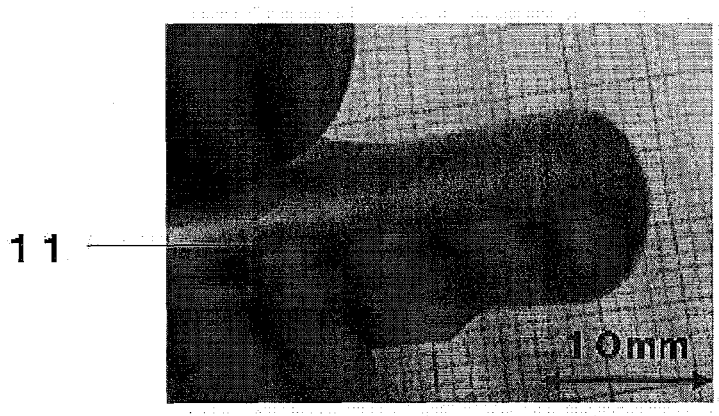
FIG. 1 illustrates folding of a graphite film imparted with flexibility.

The following discusses an embodiment of the present invention in detail. Note that all of non-patent literatures and patent literatures referenced in this specification are hereby incorporated herein by reference. Unless particularly specified in this specification, a range of value expressed by "A to B" means "not less than A (which includes A and more than A) and not more than B (which includes B and less than B)".

The present invention relates to obtainment of a graphite film which is low in graphite dust generation by properly selecting acid dianhydride and diamine which constitute a polyimide film, from which the graphite film is produced.

Specifically, the present invention has a characteristic in that a graphite film obtainable by a thermal treatment of a polyimide film having the following two molar ratios is low in graphite dust generation. A polyimide is synthesized with acid dianhydride and diamine in equimolar amounts.

(1) A graphite film made from a polyimide film as a raw material, which polyimide film is constituted by acid dianhydride and diamine, the acid dianhydride being pyromellitic acid dianhydride (hereinafter referred to as PMDA), and the diamine having a molar ratio of 4,4'-diaminodiphenyl ether (hereinafter referred to as ODA)/p-phenylenediamine (hereinafter referred to as PDA) in a range of 100:0 to 80:20. Blending ratios like the above make it possible to produce a graphite film which is low in graphite dust generation. The molar ratio for ODA/PDA is more preferably in a range of 97:3 to 83:27, and especially preferably in a range of 95:5 to 85:25, for the sake of further reduction in graphite dust generation.

(2) A graphite film made from a polyimide film as a raw material, which polyimide film is constituted by acid dianhydride and diamine, the acid dianhydride having a molar ratio of PMDA/3,3',4,4'-biphenyltetracarboxylic acid dianhydride (hereinafter referred to as BPDA) in a range of 80:20 to 50:50, and the diamine having a molar ratio of ODA/PDA in a range of 30:70 to 90:10. Blending ratios like the above make it possible to obtain a graphite film which has flexibility and is low in graphite dust generation. The molar ratio for PMDA/BPDA is more preferably in a range of 75:25 to 55:45, and especially preferably in a range of 70:30 to 60:40, for the sake of obtaining a graphite film which has more flexibility and is lower in graphite dust generation. The molar ratio for ODA/PDA is more preferably in a range of 40:60 to 90:10, especially preferably in a range of 50:50 to 90:10, further preferably in a range of 40:60 to 85:15, and more preferably in a range of 50:50 to 90:10, for the sake of further reduction in graphite dust generation and for improving folding endurance.

By changing the mixing ratio of PMDA and BPDA in the synthesis of the polyimide of the present invention, it is possible to adjust molecular orientation of the polyimide film. If BPDA having a high benzene ring ratio is increased in the blending ratio, the polyimide film can be improved in molecular orientation in plane directions.

Further, by changing the mixing ratio of ODA and PDA in the synthesis of the polyimide of the present invention, it is possible to adjust the molecular orientation of the polyimide film. If PDA, which does not have an ether bond and has a low degree of freedom, is increased in the blending ratio, the polyimide film can be improved in molecular orientation in plane directions. As such, the molecular orientation of the polyimide film can be controlled by changing the blending ratio of the monomers, thereby making it possible to prepare a polyimide film suitable as a raw material of a graphite film having a high heat conductivity and being flexible and low in graphite dust generation. Although enhancing the molecular orientation makes it possible to obtain a graphite film which foams easily and is flexible, excessive enhancement of the molecular orientation would cause such defects that, for example, the graphitization proceeds abruptly during the thermal treatment, thereby resulting in a film easy to generate graphite dust. Therefore, it is important to consider a balance of the monomers in the blending ratio.

<Thickness of Polyimide Film>

The polyimide film of the present invention is not particularly limited in terms of its thickness, but the thickness of the polyimide film is preferably not less than 5 μm and not more than 125 μm, more preferably not less than 12.5 μm and 75 μm, and further preferably not less than 20 μm and not more than 45 μm. A graphite film produced from a polyimide film having a thickness equal to or more than 5 μm can attain a strength strong enough to show folding endurance. On the other hand, if the thickness of the polyimide film is equal to or less than 125 μm, the graphite film produced from the polyimide film would be low in graphite dust generation. With a thinner thickness of the polyimide film, there is a tendency that a graphite film low in graphite dust generation can be obtained. On the other hand, with a thicker thickness of the polyimide film, there is a tendency that a graphite film having a good folding endurance can be obtained.

<Process for Producing Graphite Film>

A process for producing a graphite film of the present invention includes a carbonization process and a graphitization process.

<Carbonization Process>

Carbonization is carried out after pre-heating the polyimide film as a starting material under reduced pressure or in a nitrogen gas. The pre-heating is carried out at a temperature in a range of room temperature to 1,500° C. Thermal treatment for carbonization should be 800° C. or higher at minimum. In order to obtain a graphite film having excellent flexibility and thermal diffusivity, the thermal treatment for carbonization is preferably carried out at 900° C. or higher, and more preferably at 1000° C. or higher. In order to avoid wrinkling of the starting polymer film, the carbonization process may be carried out in such a way that the temperature is increased while the film is pressured in a thickness direction of the film to the extent that the film is not damaged.

<Graphitization Process>

Graphitization may be carried out incontinuously by transferring the carbonized film to a graphitization furnace from where the carbonization was performed, or may be carried out continuously from the carbonization. The graphitization is carried out under reduced pressure or in an inert gas. Argon or helium is suitable as the inert gas. The graphitization is carried out with a thermal treatment at 2,600° C. or higher, preferably at 2,800° C. or higher, and more preferably at 2,900° C. or higher. If the temperature for the thermal treatment is equal to or more than 2,600° C., a graphite film having excellent flexibility and thermal diffusivity, and being low in graphite dust generation can be obtained.

<Film Setting Method for Carbonization Process and Graphitization Process>

Figure 2:
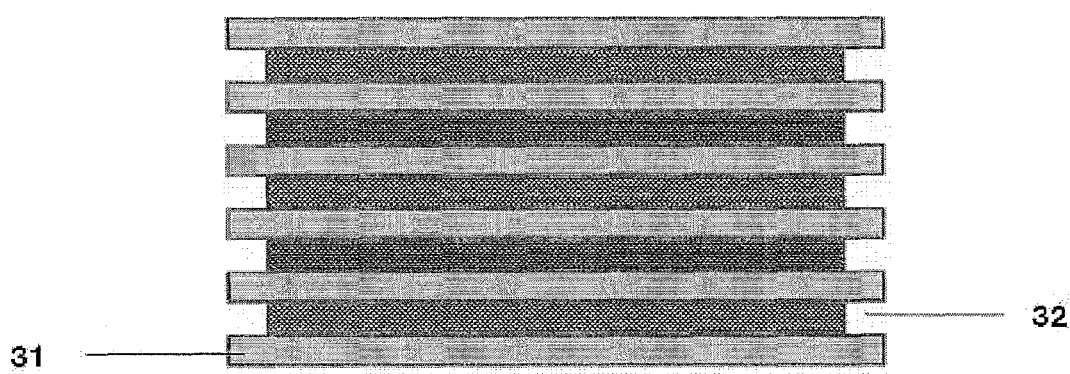
FIG. 2 illustrates a laminate in which single layered raw material films and carbonaceous sheets are alternately stacked.
Figure 3:
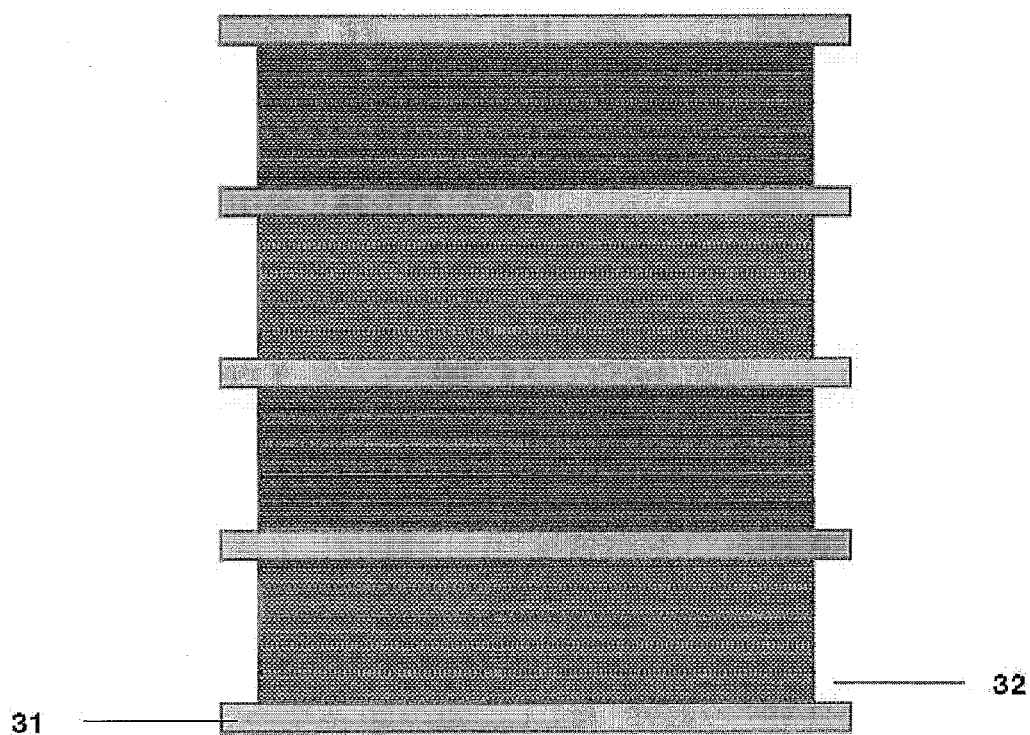
FIG. 3 illustrates a laminate in which multi-layered raw material films and carbonaceous sheets are alternately stacked.

The carbonization process and the graphitization process of the present invention are not particularly limited in terms of setting the film for these processes. For example, the heat treatment may be carried out with a single layered material film or a multi-layered raw material film sandwiched and retained between carbonaceous sheets as shown in FIGS. 2 and 3.

A more preferable aspect of a process for producing a graphite film having flexibility in the present invention is such that the carbonization process and the graphitization process are carried out with a laminate of two or more raw material films.

Figure 4:
FIG. 4 illustrates a process for graphitization of a raw material film in a rolled state.

Further, the thermal treatment may be carried out with the raw material film rolled in a cylindrical shape as shown in FIG. 4.

Here, examples of the carbonaceous sheet include: isotropic graphite sheets made by Toyo Tanso Co., Ltd. (product names: IG-11, ISEM-3 etc.), C/C composite plates made by Toyo Tanso Co., Ltd. (product names: CX-26, CX-27 etc.), extruded graphite plates made by SEC CARBON, LIMITED (product names: PSG-12, PSG-332 etc.), and expanded graphite sheets made by Toyo Tanso Co., Ltd. (product names: PERMA-FOIL (grade: PF, PF-R2, PF-UHPL)) etc.

<Temperature of Thermal Treatment for the Present Invention>

The temperatures specified for the thermal treatments of the present invention (carbonization process, graphitization process) are actual temperatures at a center of a heater(s) used for the thermal treatments. The temperature of the heater(s) may be measured by using a thermocouple when the temperature to measure is equal to or less than 1,200° C., and by using a radiation thermometer when the temperature to measure is more than 1,200° C.

<Thickness of Graphite Film>

The graphite film of the present invention is not particularly limited in terms of its thickness. The thickness of the graphite film is preferably 5 to 300 μm, more preferably 5 to 40 μm, and further preferably 10 to 21 μm. For example, from a polyimide film having a thickness within a range of not less than 5 μm and not more than 125 μm, a graphite film having a thickness of 5 μm to 100 μm can be obtained. From a polyimide film having a thickness within a range of not less than 12.5 μm and not more than 75 μm, a graphite film having a thickness of 5 μm to 40 μm can be obtained. From a polyimide film having a thickness within a range of not less than 20 μm and not more than 45 μm, a graphite film having a thickness of 10 μm to 21 μm can be obtained. It is preferable that a graphite film has a thickness within foregoing ranges, because such a graphite film is low in graphite dust generation. With a thinner thickness of the graphite film, there is a tendency that a resulting graphite film is low in graphite dust generation. On the other hand, with a thicker thickness of the polyimide film, there is a tendency that the resulting graphite film has a good folding endurance.

<Polyimide Film and Birefringence>

The polyimide film that can be used in the present invention is not particularly limited in terms of its birefringence. A graphite film that foams easily and has flexibility is easily obtained from a film having a high birefringence. However there is a problem that a resulting graphite film easily generates graphite dust. Even if a polyimide film having a birefringence equal to or more than 0.12, especially equal to or more than 0.13, or furthermore equal to or more than 0.14 is used as a raw material film, a graphite film having flexibility and being low in graphite dust generation can be obtained if the polyimide film is constituted by acid dianhydride and diamine, which acid dianhydride has a molar ratio of PMDA/BPDA in a range of 80:20 to 50:50, and which diamine has a molar ratio of ODA/PDA in a range of 30:70 to 90:10.

<Birefringence>

The birefringence means a difference between a refractive index in any in-plane directions of a film and a refractive index in a thickness direction of the film. A method for measuring a birefringence is described in Examples.

<Process for Producing Polyimide Film>

The process for preparing a polyamide acid for use in the present invention is not particularly limited. The polyimide acid may be produced, for example, by dissolving aromatic acid dianhydride and diamine in substantially equimolar amounts into an organic solvent, and stirring a resulting organic solution under a controlled temperature condition until polymerization of the acid dianhydride and the diamine is completed. Polymerization methods are not particularly limited. However the following polymerization methods (1) to (5) are preferable, for example.

(1) A polymerization method in which an aromatic diamine is dissolved in an organic polar solvent and is reacted with an aromatic tetracarboxylic acid dianhydride in a substantially equimolar amount to the aromatic diamine.

(2) A polymerization method in which an aromatic tetracarboxylic acid dianhydride and an aromatic diamine compound are reacted with each other in an organic polar solvent to obtain a prepolymer having an acid anhydride group at each terminal. The aromatic diamine compound has a molar amount smaller than that of the aromatic tetracarboxylic acid dianhydride. Subsequently, the prepolymer thus obtained is polymerized with an/the aromatic diamine compound in an amount that makes up a substantially equimolar amount of the aromatic diamine compound(s) to the aromatic tetracarboxylic acid dianhydride.

Note that the polymerization method (2) for the polyamide acid synthesis may be such that a prepolymer having the acid dianhydride at each terminal is synthesized with a diamine and an acid dianhydride, and the prepolymer is reacted with another diamine which is different from the diamine.

(3) A polymerization method in which an aromatic tetracarboxylic acid dianhydride and an aromatic diamine compound are reacted in an organic polar solvent to obtain a prepolymer having an amino group at each terminal. The aromatic diamine compound has a molar amount larger than that of the aromatic tetracarboxylic acid dianhydride. Subsequently, an/the aromatic diamine compound is further added to the prepolymer obtained. Then, the prepolymer is polymerized with a tetracarboxylic acid dianhydride in such an amount that makes up a substantially equimolar amount of the aromatic tetracarboxylic acid dianhydride to the aromatic diamine compound(s).

(4) A polymerization method in which an aromatic tetracarboxylic acid dianhydride is dissolved and/or dispersed in an organic polar solvent, and a resulting organic solution is polymerized with an aromatic diamine compound in a substantially equimolar amount to the aromatic acid dianhydride.

(5) A polymerization method in which a mixture of an aromatic tetracarboxylic acid dianhydride and an aromatic diamine in substantially equimolar amounts, is reacted in an organic polar solvent for polymerization.

Among these, the polymerization methods shown in (2) and (3) for sequential control (sequence control) via a prepolymer to control the combinations of block polymers and the links of block polymer molecules are preferable. This is because, by using these methods, a polyimide film having a large birefringence and a small coefficient of linear expansion can easily be obtained. Further, use of the polyimide film allows the thermal treatments to produce a graphite having an excellent heat conductivity and flexibility easily.

<Folding Endurance of Graphite Film>

The graphite film is flexable preferably 5,000 times or more, more preferably 10,000 times or more, further preferably 50,000 times or more and especially preferably 100,000 times or more on an MIT folding endurance test. A graphite film that can be flexed 5,000 times or more on the MIT folding endurance test is excellent because the graphite film is not susceptible to damage in handling. Note that, the times of flexing of the graphite film on the MIT folding endurance test can be evaluated on an "MIT folding endurance test of graphite film" described in Examples later.

<Thin Polyimide Film>

When a polyimide film is thin, foaming the graphite film becomes difficult (it is difficult to give the graphite film a flexibility). This problem can be alleviated by using, as a raw material of the present invention, a polyimide film having a high molecular orientation by having a certain monomer ratio. However, in a case where such a polyimide film having a high molecular orientation is used as a raw material, it causes a problem of generating graphite dust easily. Note, here, that the process of the present invention for reducing the graphite dust generation is also effective to overcome the problem.

As to the thickness of the polyimide film, a lower limit of the thickness is preferably 5 μm or more, more preferably 7 μm or more, further preferably 10 μm or more and especially preferably 20 μm or more and a upper limit of the thickness is preferably 45 μm or less, more preferably 40 μm or less and further preferably 30 μm or less. Even when a polyimide film having a thickness which falls within a range between the lower limit and the upper limit is used, a graphite film having flexibility and being low in graphite dust generation is obtained provided that the polyimide film is produced from acid dianhydride and diamine, in which the acid dianhydride has a molar ratio of PMDA/BPDA in a range of 80:20 to 50:50 and the diamine has a molar ratio of ODA/PDA in a range of 30:70 to 90:10.

Note that, the lower limit and the upper limit can be appropriately combined.

<Effective Heating Volume of Furnace>

There is such a problem that, even under a condition that a flexible graphite film can be obtained in accordance with a process for producing a graphite film by using a polymer film having a thickness of 50 μm or more, such a flexible graphite film can not be obtained under the same condition if a polymer film having a thickness of 45 μm or less is used and a furnace having an effective heating volume of 2 L or more is used for heating the polymer film. It is considered that the increased effective volume inside the furnace results in an increase in concentration of metal impurity, such as iron, in the furnace, so that the graphite film becomes harder due to the metal impurity.

Usually, in order to realize a graphite film having flexibility, enhancing a molecular orientation by altering a composition of a polyimide film (raw material of the graphite film) is carried out. However, such molecular orientation enhancement is associated with a problem that the resulting graphite film tends to generate graphite dust. The polyimide film used in the present invention is capable of producing a graphite film having flexibility without having such tendency to generate graphite dust.

The present invention is effective when the furnace whose effective heating volume is 2 L or more, further 30 L or more and especially 50 L or more is used. The furnace whose effective heating volume is 2 L or more is important. Note that, the effective heating volume of the furnace means volume of space enclosed by a heat-insulating material, so that space is substantially equally heated.

In addition, the present invention can include inventions according to the following aspects.

(a) A graphite film wherein if (i) the graphite film is cut into 30-mm square, on which a 50 mm-square polyimide film is stacked, (ii) the graphite film obtained in (i) is subjected to pressure bonding with the polyimide film by being pressed, on a flat pedestal, with a roller of 2 kg by weight which is defined in ISO/DIS 2411, (iii) the graphite film is then separated from the polyimide film, the polyimide film has less than 2 graphite dust particles equal to or more than 0.1 mm in major axis.

(b) The graphite film according to (a), wherein the graphite film is made from a polyimide film as a raw material, wherein the polyimide film is constituted by acid dianhydride and diamine, the acid dianhydride being PMDA and the diamine having a molar ratio of ODA/PDA in a range of 100:0 to 80:20.

(c) The graphite film according to (a), the graphite film is made from a polyimide film as a raw material, wherein the polyimide film constituted by acid dianhydride and diamine, the acid dianhydride having a molar ratio of PMDA/BPDA in a range of 80:20 to 50:50 and the diamine having a molar ratio of ODA/PDA in a range of 30:70 to 90:10.

(d) A process for producing a graphite film, the process including carrying out a thermal treatment on a polyimide film at a temperature equal to or more than 2,600° C., the polyimide film being constituted by acid dianhydride (1) and diamine (2), the acid dianhydride (1) being PMDA and the diamine (2) having a molar ratio of ODA/PDA in a range of 100:0 to 80:20.

(e) A process for producing a graphite film, the process including carrying out a thermal treatment on a polyimide film at a temperature equal to or more than 2,600° C., the polyimide film being constituted by acid dianhydride (1) and diamine (2), the acid dianhydride (1) having a molar ratio of PMDA/BPDA in a range of 80:20 to 50:50 and the diamine (2) having a molar ratio of ODA/PDA in a range of 30:70 to 90:10.

The present invention is not limited to the foregoing aspects, but may be altered within the scope of the Description. An embodiment derived from a proper combination of technical means disclosed in different embodiments is also encompassed in the technical scope of the invention. Furthermore, all documents referenced in the Description are incorporated herein by reference. The following Examples describe the present invention in further detail. It should be noted that the present invention is not limited to the Examples.

EXAMPLES

Various Examples of the present invention will be described below along with some Comparative Examples.

<Conditions for Measurement of Various Physical Properties>

<Measurement of Thermal Diffusivity in Plane Directions of Graphite Film>

Figure 5:
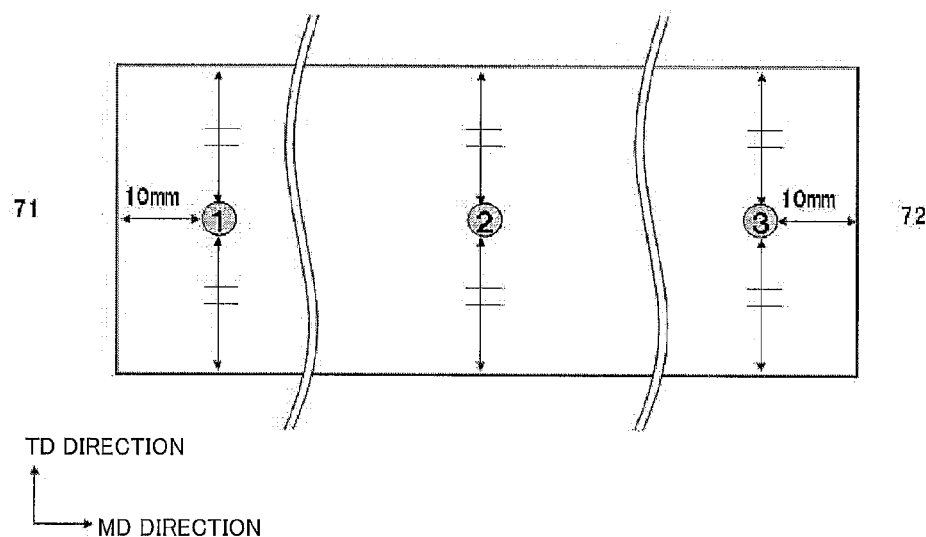
FIG. 5 illustrates locations where samples were sampled for physical properties measurement of a graphite film.

Thermal diffusivity in plane directions of graphite films was measured with samples prepared by cutting out the graphite films into a shape of 4 mm×40 mm. The measurement was conducted with an apparatus for measuring thermal diffusivity by an optical alternating current method ("LaserPit" manufactured by ULVAC-RIKO, Inc.) in an atmosphere of 23° C. at 10 Hz. Three samples were cut out from a middle portion of a sheet-shaped sample. The three samples were stacked and subjected to the thermal treatments. Then, physical properties of the middle one of the samples thus laminated were measured. For a rolled sample, the three samples were cut out from points 1, 2 and 3 indicated in FIG. 5, respectively. The point 1 was at 10 mm from a side from which the graphite film was rolled up, and almost middle of the rolled sample. The point 3 was at 10 mm from the opposite side, and almost middle of the rolled sample. The point 2 was at the middle of the points 1 and 3. In a case where a rolled sample whose transverse direction width was 200 mm was used, the almost middle meant the vicinity of 100 mm wide from an edge. Table 1 shows average values of the thermal diffusivities measured by using the three samples.

<MIT Folding Endurance Test for Graphite Film>

The MIT folding endurance test was carried out for the graphite films. Three samples of each graphite film of 1.5 cm×12 cm were cut out from the middle portion of a sheet-shaped sample. The three samples were stacked and subjected to the thermal treatments. Then, physical properties of the middle one of the samples thus laminated were measured. For a rolled sample, the three samples were cut out from points 1, 2 and 3 indicated in FIG. 5, respectively. The MIT folding endurance test was carried out to count the number of flexing until the three samples were broke. The MIT folding endurance test was performed by using a MIT folding endurance fatigue testing machine model D (manufactured by TOYO SEIKI Co., Ltd.) under conditions that (i) a load was 100 gf (0.98 N), (ii) a bending rate was 90 times/min, (iii) a curvature radius R of the bending clamp was 2 mm, (iv) an atmosphere was at 23° C. and (v) a bending angle was 90° forward and backward. In this manner, the three samples were tested. Table 1 shows the average values of the three samples.

<Method for Measuring Area of Polyimide Film and Graphite Film>

Areas of a polyimide film and a graphite film were calculated by multiplying measured widths and lengths of each of the films. In the case of the rolled sample, areas of the polyimide film and the graphite film were calculated based on the ratio of entire weights of the polyimide film and the graphite film to weights of cut-out pieces (100 mm×100 mm) cut out from the entire polyimide film and graphite film.

<Method for Measuring Thickness of Polyimide Film and Graphite Film>

Thicknesses of a polyimide film and a graphite film were measured by using a gauge thickness (HEIDENHAIN-CERTO manufactured by HEIDENHAIN CORPORATION) under a condition of an atmosphere at 23° C.

<Method for Measuring Birefringence of Polyimide Film>

Figure 6:
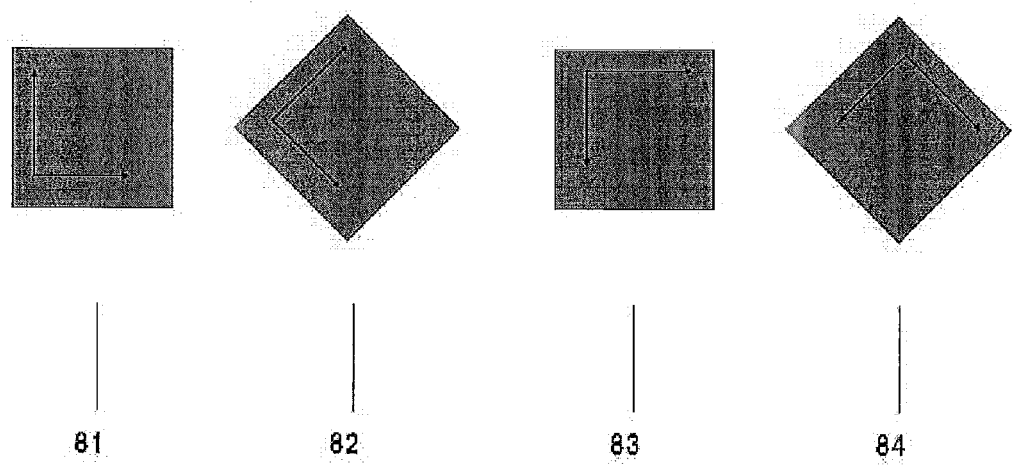
FIG. 6 illustrates angles at which the samples were set in birefringence measurement.

A birefringence of a polyimide film was measured by using a measurement system of refractive index and film thickness manufactured by Metricon Corporation (Model: 2010 Prism Coupler). The measurement was carried out under a condition of an atmosphere at 23° C. Using a light source having a wavelength of 594 nm, refractive indices were measured with TE mode and TM mode, respectively. A value of TE-TM was calculated out as the birefringence. Note, here, that, "any in-plane direction X of the film" refers to any of 0° direction, 45° direction, 90° direction and 135° direction, as shown in FIG. 6, in the plane with reference to the direction of material flow when the film is formed, for example. Accordingly, the measurement of the birefringence was preferably carried out by setting samples in an apparatus in 0° direction, 45° direction, 90° direction and 135° direction and the birefringence at each angle was measured and then average values of the measured birefringence were described in Table 1.

<Wrinkles on Graphite Film>

Figure 7:
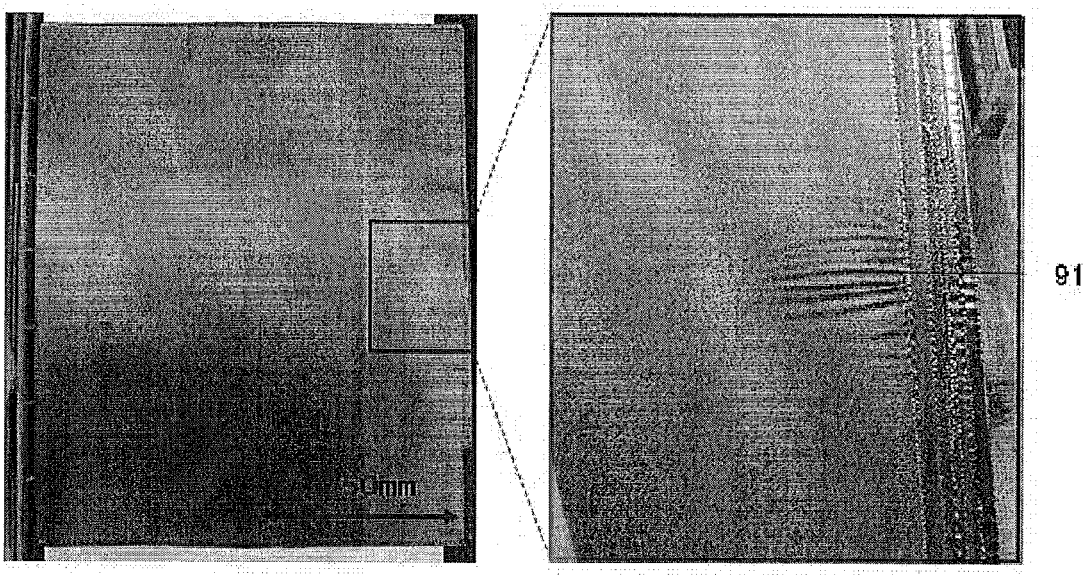
FIG. 7 illustrates wrinkles formed on a graphite film.

A maximum length of a wrinkle which generated after a graphitization a graphite film as shown in FIG. 7 was measured. The maximum length of the wrinkle which could be observed visually is described herein such that when the maximum length of the wrinkle was not less than 0 mm and not more than 5 mm, it was evaluated as A, when the maximum length of the wrinkle was not less than 5 mm and not more than 10 mm, it was evaluated as B, when the maximum length of the wrinkle was not less than 10 mm and not more than 20, it was evaluated as C, and when the maximum length of the wrinkle is 20 mm or more, it was evaluated as D.

<Graphite Dust Drop from Graphite Film>

The number of graphite dust particles dropped from a graphite film after the graphitization was counted. A graphite film was cut into 30 mm-square on which a 50 mm-square polyimide film of 50 μm (manufactured by Kaneka Corporation, Apical AH) was stacked and the two films were bonded together by pressure bonding by being pressed, on a flat pedestal, with a roller of 2 kg by weight as defined in ISO/DIS 2411 and then the graphite film was separated from the polyimide film. When the number of graphite dust particles whose major axis was 0.1 mm or more on the polyimide film was 2 or less, it was evaluated as A, when the number of graphite dust particles whose major axis was not less than 2 and not more 3, it was evaluated as A', when the number of graphite dust particles whose major axis was not less than 3 and not more than 5, it was evaluated as B, when the number of graphite dust particles whose major axis was not less than 5 and not more than 10, it was evaluated as C, when the number of graphite dust particles whose major axis was more than 10, it was evaluated as D.

<Polyimide Films A to K>

[Process for Producing Polyimide Film A]

Diamine composed of 75 mole percent of ODA and 25 mole percent of PDA was dissolved in a DMF (dimethylformamide) solution. Acid dianhydride composed of 100 mole percent of PMDA in an equimolar amount with the diamine was dissolved in the DMF solution, thereby obtaining a polyamide acid solution (18.5 wt %). While cooling the solution, an imidization catalyst containing 1 equivalent of acetic acid anhydride, 1 equivalent of isoquinoline and DMF (with respect to carboxylic acid group contained in the polyamide acid) was added to the solution and then the solution was defoamed so as to obtain a mixture solution. Then, the mixture solution was applied to an aluminum foil in such a way that the mixture solution would have a predetermined thickness after being dried. The drying was carried out to the mixture solution layer on the aluminum foil by using a hot air oven and a far infrared heater.

The following illustrates drying conditions for producing a polyimide film having a final thickness of 75 μm. The mixture solution layer on the aluminum foil was dried in the hot air oven at 120° C. for 240 seconds, thereby converting the mixture solution into a self-supporting gel film. The gel film was separated from the aluminum foil and then fixed on a frame. The gel film was gradually heated and dried in the hot air oven at 120° C. for 30 seconds, 275° C. for 40 seconds, 400° C. for 43 seconds and 450° C. for 50 seconds and then in the far infrared heater at 460° C. for 23 seconds. For polyimide films having different thicknesses, the baking time was controlled in proportion to the thicknesses. For example, in a case where a polyimide film having a thickness of 25 μm was produced, the baking time was set to be one third of the baking time for the polyimide film having the thicknesses of 75 μm.

In accordance with the above process, two polyimide films A (each of which had a birefringence of 0.143 and coefficient of liner expansion of $21.8 \times 10^{-6}/°$ C.) having thicknesses of 25 μm and 37 μm were produced.

[Process for Producing Polyimide Film B]

Two polyimide films B (each of which had a birefringence of 0.122 and coefficient of liner expansion of $23.7 \times 10^{-6}/°$ C.) having thicknesses of 25 μm and 37 μm were produced in the same manner as the polyimide films A, except that a polyamide acid was prepared by dissolving acid dianhydride composed of 100 mole percent of PMDA in a DMF (dimethylformamide) solution produced by dissolving diamine composed of 90 mole percent of ODA and 10 mole percent of PDA, so that an amount of the acid dianhydride thus added was to make up an equimolar amount with the diamine.

[Process for Producing Polyimide Film C]

Two polyimide films C (each of which had a birefringence of 0.115 and coefficient of liner expansion of $27.9 \times 10^{-6}/°$ C.) having thicknesses of 25 μm and 37 μm were produced in the same manner as the polyimide films A, except that a polyamide acid was prepared by dissolving acid dianhydride composed of 100 mole percent of PMDA in a DMF (dimethylformamide) solution produced by dissolving diamine composed of 100 mole percent of ODA, so that an amount of the acid dianhydride thus added was to make up an equimolar amount with the diamine.

[Process for Producing Polyimide Film D]

Two polyimide films D (each of which had a birefringence of 0.148 and coefficient of liner expansion of $16.8 \times 10^{-6}/°$ C.) having thicknesses of 25 μm and 37 μm were produced in the same manner as the polyimide films A, except that a polyamide acid was prepared by dissolving acid dianhydride composed of 65 mole percent of PMDA and 35 mole percent of BPDA in a DMF (dimethylformamide) solution produced by dissolving diamine composed of 40 mole percent of ODA and 60 mole percent of PDA, so that an amount of the acid dianhydride thus added was to make up an equimolar amount with the diamine.

[Process for Producing Polyimide Film E]

Five polyimide films E having thicknesses of 12.5 μm, 25 μm, 37 μm, 50 μm and 75 μm (each of which had coefficient of liner expansion of $16.2 \times 10^{-6}/°$ C. and a birefringence of 0.150 for the 12.5-μm-thick polyimide film, 0.149 for the 25 and 37-μm-thick polyimide films, 0.148 for the 50-μm-thick polyimide film and 0.147 for the 75-μm-thick polyimide film) were produced in the same manner as the polyimide films A, except that a polyamide acid was prepared by dissolving acid dianhydride composed of 65 mole percent of PMDA and 35 mole percent of BPDA in a DMF (dimethylformamide) solution produced by dissolving diamine composed of 85 mole percent of ODA and 15 mole percent of PDA, so that an amount of the acid dianhydride thus added was to make up an equimolar amount with the diamine.

[Process for Producing Polyimide Film F]

Two polyimide films F (each of which had a birefringence of 0.148 and coefficient of liner expansion of $16.9 \times 10^{-6}/°$ C.) having thicknesses of 25 μm and 37 μm were produced in the same manner as the polyimide films A, except that a polyamide acid was prepared by dissolving acid dianhydride composed of 100 mole percent of PMDA in a DMF (dimethylformamide) solution produced by dissolving diamine composed of 25 mole percent of ODA and 75 mole percent of PDA, so that an amount of the acid dianhydride thus added was to make up an equimolar amount with the diamine.

[Process for Producing Polyimide Film G]

Two polyimide films G (each of which had a birefringence of 0.135 and coefficient of liner expansion of $22.6 \times 10^{-6}/°$ C.) having thicknesses of 25 μm and 37 μm were produced in the same manner as the polyimide films A, except that a polyamide acid was prepared by dissolving acid dianhydride composed of 100 mole percent of PMDA in a DMF (dimethylformamide) solution produced by dissolving diamine composed of 80 mole percent of ODA and 20 mole percent of PDA, so that an amount of the acid dianhydride thus added was to make up an equimolar amount with the diamine.

[Process for Producing Polyimide Film H]

Two polyimide films H (each of which had a birefringence of 0.149 and coefficient of liner expansion of $16.7 \times 10^{-6}/°$ C.) having thicknesses of 25 μm and 37 μm were produced in the same manner as the polyimide films A, except that a polyamide acid was prepared by dissolving acid dianhydride composed of 65 mole percent of PMDA and 35 mole percent of BPDA in a DMF (dimethylformamide) solution produced by dissolving diamine composed of 90 mole percent of ODA and 10 mole percent of PDA, so that an amount of the acid dianhydride thus added was to make up an equimolar amount with the diamine.

[Process for Producing Polyimide Film I]

Two polyimide films I (each of which had a birefringence of 0.148 and coefficient of liner expansion of $16.8 \times 10^{-6}/°$ C.) having thicknesses of 25 μm and 37 μm were produced in the same manner as the polyimide films A, except that a polyamide acid was prepared by dissolving acid dianhydride composed of 65 mole percent of PMDA and 35 mole percent of BPDA in a DMF (dimethylformamide) solution produced by dissolving diamine composed of 30 mole percent of ODA and 70 mole percent of PDA, so that an amount of the acid dianhydride thus added was to make up an equimolar amount with the diamine.

[Process for Preparing Polyimide Film J]

Two polyimide films J (each of which had a birefringence of 0.134 and coefficient of liner expansion of $20.1 \times 10^{-6}/°$ C.) having thicknesses of 25 μm and 37 μm were produced in the same manner as the polyimide films A, except that a polyamide acid was prepared by dissolving acid dianhydride composed of 80 mole percent of PMDA and 20 mole percent of BPDA in a DMF (dimethylformamide) solution produced by dissolving diamine composed of 85 mole percent of ODA and 15 mole percent of PDA, so that an amount of the acid dianhydride thus added was to make up an equimolar amount with the diamine.

[Process for Preparing Polyimide Film K]

Two polyimide films K (each of which had a birefringence of 0.153 and coefficient of liner expansion of $15.9 \times 10^{-6}/°$ C.) having thicknesses of 25 μm and 37 μm were produced in the same manner as the polyimide films A, except that a polyamide acid was prepared by dissolving acid dianhydride composed of 50 mole percent of PMDA and 50 mole percent of BPDA in a DMF (dimethylformamide) solution produced by dissolving diamine composed of 85 mole percent of ODA and 15 mole percent of PDA, so that an amount of the acid dianhydride thus added was to make up an equimolar amount with the diamine.

Example 1

Five 200 mm×200 mm polyimide films B (PI (B)) each of which had a thickness of 25 μm were laminated directly so that edges of the films were aligned. Then the laminate of polyimide films was sandwiched between two 220 mm×220 mm graphite sheets (the laminate of five stacked polyimide films and two graphite sheets were stacked alternately). The stacked films and sheets were heated to 1,000° C. at a heating rate of 2° C./min in a nitrogen atmosphere using an electric furnace having effective heating volume of 70 L and then thermally treated at 1,000° C. for one hour so as to be carbonized.

Then, a 220 mm×220 mm graphite plate having a weight of 5.12 Kg was put on the laminate of the films and sheets so as to apply pressure of 20 g/cm² on a thickness direction of the laminate of the films and sheets. Then, the laminate of the films and sheets were heated at a graphitization heating rate of 2.5° C./min in such a way that the heating was carried out under a reduced pressure of 50 Pa or less (measured by a Pirani gauge) between 1,400 to 2,200° C. and then under an argon atmosphere after the temperature exceeded 2,200° C. until the temperature reached 2,900° C. (maximum temperature of graphitization). The laminate of the films and sheets was then heated at 2,900° C. for 30 minutes. In this way, a graphite film was produced. Note that, a graphitization furnace used in this process had effective heating volume of 70 L.

Then a 180 mm×180 mm piece of the graphite film thus obtained was sandwiched by two 200 mm×200 mm PET films each of which had a thickness of 400 μm, thereby preparing a laminate. The laminate was then subjected to a compression treatment by using a compression molding machine. In the compression treatment, 10 MPa pressure was applied to the laminate. The same experiment was also carried out on the polyimide film B having a thickness of 37 μm.

Example 2

A graphite film was produced in the same manner as Example 1, except that the polyimide film C (PI (C)) having a thickness of 25 μm was used as a raw material. The same experiment was also carried out on the polyimide film C having a thickness of 37 μm.

Example 3

A graphite film was produced in the same manner as Example 1, except that the polyimide film D (PI (D)) having a thickness of 37 μm was used as a raw material. The same experiment was also carried out on the polyimide film D having a thickness of 25 μm.

Example 4

A graphite film was produced in the same manner as Example 1, except that the polyimide film E (PI (E)) having a thickness of 37 μm was used as a raw material. The same experiment was also carried out on polyimide films E each of which had a thickness of 12.5 μm, 25 μm, 50 μm and 75 μm.

Example 5

A graphite film was produced in the same manner as Example 1, except that the polyimide film G (PI (G)) having a thickness of 25 μm was used as a raw material. The same experiment was also carried out on the polyimide film G having a thickness of 37 μm.

Example 6

A graphite film was produced in the same manner as Example 1, except that the polyimide film H (PI (H)) having a thickness of 37 μm was used as a raw material. The same experiment was also carried out on the polyimide film H having a thickness of 25 μm.

Example 7

A graphite film was produced in the same manner as Example 1, except that the polyimide film I (PI (I)) having a thickness of 37 μm was used as a raw material. The same experiment was also carried out on the polyimide film I having a thickness of 25 μm.

Example 8

A graphite film was produced in the same manner as Example 1, except that the polyimide film J (PI (J)) having a thickness of 37 μm was used as a raw material. The same experiment was also carried out on the polyimide film J having a thickness of 25 μm.

Example 9

A graphite film was produced in the same manner as Example 1, except that the polyimide film K (PI (K)) having a thickness of 37 μm was used as a raw material. The same experiment was also carried out on the polyimide film K having a thickness of 25 μm.

Comparative Example 1

A graphite film was produced in the same manner as Example 1, except that the polyimide film A (PI (A)) having a thickness of 25 μm was used as a raw material. The same experiment was also carried out on the polyimide film A having a thickness of 37 μm.

Comparative Example 2

A graphite film was produced in the same manner as Example 1, except that the polyimide film F (PI (F)) having a thickness of 25 μm was used as a raw material. The same experiment was also carried out on the polyimide film F having a thickness of 37 μm.

Reference Example 1

A graphite film was produced in the same manner as Example 2, except that an electric furnace having effective heating volume of 1.5 L was used.

Reference Example 2

A graphite film was produced in the same manner as Example 4, except that the electric furnace having effective heating volume of 1.5 L was used.

The process for producing polyimide films and physical properties of respective obtained polyimide films and graphite films were summarized in Table 1 below.

TABLE 1

| | | Polymide film | | | | | |
|---|---|---|---|---|---|---|---|
| | | Acid dianhydride | | Diamine | | | |
| | Type | PMDA pyromellitic acid dianhydride | BPDA 3,3,'4,4'-biphenyl- tetracarboxylic acid dianhydride | ODA 4,4'diamino- phenylether | PDA paraphenylene- diamine | Thickness (μm) | Birefringence |
| Example 1 | PI(B) | 100 | — | 90 | 10 | 25 | 0.122 |
| | | | | | | 37 | 0.122 |
| Example 2 | PI(C) | 100 | — | 100 | — | 25 | 0.115 |
| | | | | | | 37 | 0.115 |
| Example 3 | PI(D) | 65 | 35 | 40 | 60 | 25 | 0.148 |
| | | | | | | 37 | 0.148 |
| Example 4 | PI(E) | 65 | 35 | 85 | 15 | 12.5 | 0.150 |
| | | | | | | 25 | 0.149 |
| | | | | | | 37 | 0.149 |
| | | | | | | 50 | 0.148 |
| | | | | | | 75 | 0.147 |
| Comparative Example 1 | PI(A) | 100 | — | 75 | 25 | 25 | 0.143 |
| | | | | | | 37 | 0.143 |
| Comparative Example 2 | PI(F) | 100 | — | 25 | 75 | 25 | 0.148 |
| | | | | | | 37 | 0.148 |
| Example 5 | PI(G) | 100 | — | 80 | 20 | 25 | 0.135 |
| | | | | | | 37 | 0.135 |
| Example 6 | PI(H) | 65 | 35 | 90 | 10 | 25 | 0.149 |
| | | | | | | 37 | 0.149 |
| Example 7 | PI(I) | 65 | 35 | 30 | 70 | 25 | 0.148 |
| | | | | | | 37 | 0.148 |
| Example 8 | PI(J) | 80 | 20 | 85 | 15 | 25 | 0.134 |
| | | | | | | 37 | 0.134 |
| Example 9 | PI(K) | 50 | 50 | 85 | 15 | 25 | 0.153 |
| | | | | | | 37 | 0.153 |
| Reference Example 1 | PI(C) | 100 | — | 100 | — | 37 | 0.115 |
| Reference Example 2 | PI(E) | 65 | 35 | 85 | 15 | 37 | 0.149 |

| | Physical properties of graphite film | | | | | |
|---|---|---|---|---|---|---|
| | Thickness (μm) | Flex resistance (times of flexing) | Actual times of flexing | Wrinkle | Graphite dust drop | Thermal diffusivity ( /s) |
| Example 1 | 10 | >5000 | 6734 | C | A | 8.3 |
| | 17 | >5000 | 7908 | B | A | 8.2 |
| Example 2 | 10 | <10 | 3 | D | A | 8.3 |
| | 17 | <10 | 5 | C | A | 8.2 |
| Example 3 | 10 | >100000 | 379933 | C | A | 8.6 |
| | 17 | >100000 | 495872 | B | A | 8.5 |
| Example 4 | 5 | >50000 | 89367 | B | A | 8.7 |
| | 10 | >500000 | 504289 | A | A | 8.6 |
| | 17 | >500000 | 768334 | A | A | 8.6 |
| | 25 | >100000 | 108947 | A | A' | 8.5 |
| | 40 | >10000 | 39874 | A | A' | 8.4 |
| Comparative Example 1 | 10 | >100000 | 239435 | A | B | 8.3 |
| | 17 | >100000 | 284783 | A | B | 8.2 |
| Comparative Example 2 | 10 | >100000 | 108934 | A | D | 8.3 |
| | 17 | >100000 | 238940 | A | D | 8.2 |
| Example 5 | 10 | >100000 | 100089 | A | A' | 8.3 |
| | 17 | >100000 | 138976 | A | A' | 8.2 |
| Example 6 | 10 | >10000 | 41894 | B | A | 8.5 |
| | 17 | >10000 | 46765 | A | A | 5.4 |
| Example 7 | 10 | >100000 | 388873 | A | A' | 8.3 |
| | 17 | >100000 | 418998 | B | A' | 8.2 |
| Example 8 | 10 | >5000 | 8938 | B | A | 8.6 |
| | 17 | >5000 | 9453 | A | A | 8.6 |
| Example 9 | 10 | >500000 | 512349 | B | A' | 8.4 |
| | 17 | >500000 | 753923 | A | A' | 8.3 |
| Reference Example 1 | 17 | >10000 | 38784 | C | A | 8.2 |
| Reference Example 2 | 17 | >500000 | 879376 | A | A | 8.6 |

<Results>

Examples 1 to 9 and Comparative Examples 1 and 2 were compared.

In Examples 1, 2 and 5, graphite films which generated low in graphite dust generation were obtained since polyimide films (raw materials of the graphite films) were produced from acid dianhydride and diamine, in which the acid dianhydride was PMDA and the diamine had a ratio of ODA/PDA in a range of 100:0 to 80:20. In Examples 1 and 5, the obtained graphite films had a flexibility showing a folding endurance of 5,000 or more times on the MIT folding endurance test since PDA without ether linkage and having a low degree of freedom (flexibility) was used so that the orientation in plane direction of the polyimide films were increased than in Example 2. Furthermore, in Example 1, a graphite film which is extremely low in graphite dust generation was obtained since the amount of PDA used was more appropriate compared with Example 5.

In Examples 3, 4 and 6 to 9, graphite films which were low in graphite dust generation were obtained since polyimide films (raw materials of the graphite films) were produced from acid dianhydride and diamine, in which the acid dianhydride had a ratio of PMDA/BPDA in a range of 80:20 to 50:50 and the diamine had a ratio of ODA/PDA in a range of 30:70 to 90:10. In these Examples, graphite films having extremely excellent flexibility were obtained since BPDA and PDA which enhance orientation in plane direction of the polyimide films were also used so as to foam the graphite films. In particular, in Example 4, a graphite film having extremely excellent flexibility which showed a folding endurance of 50,000 or more times on the MIT folding endurance test was obtained by using a low proportion of PDA (ODA/PDA=85:15). In Example 3, a graphite film which generated low in graphite dust generation was obtained even though proportion of PDA was high because proportion of BPDA was also high.

Figure 8:
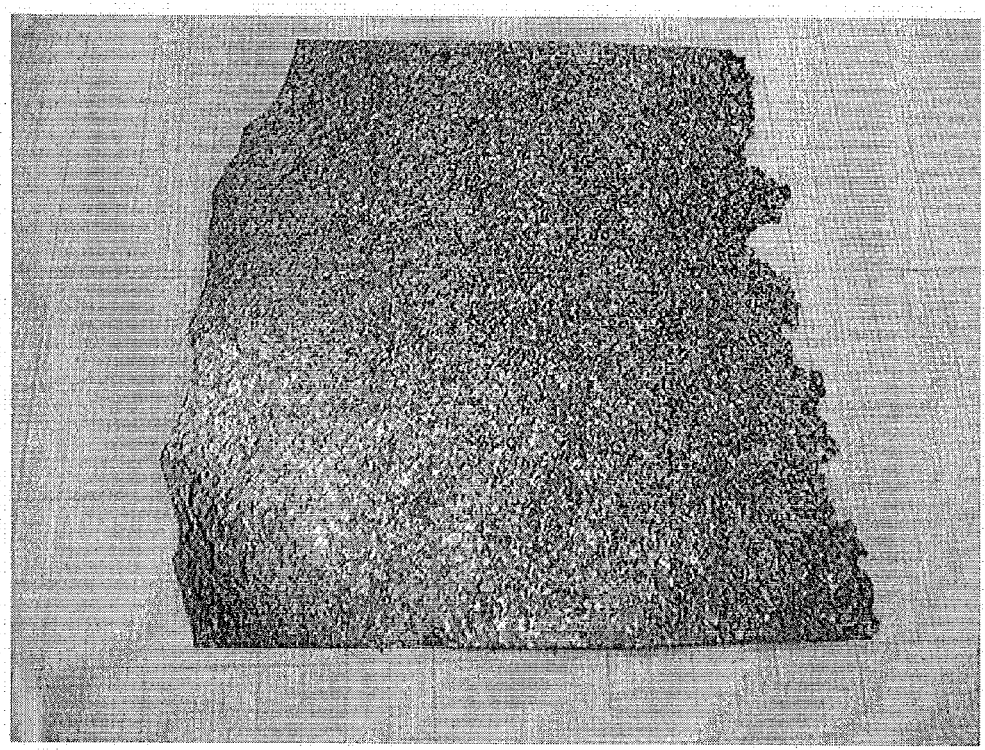
FIG. 8 illustrates a graphite film on which graphite dust is generated.

On the other hand, in Comparative Examples 1 and 2, although graphite films having flexibility were obtained, the obtained graphite films generated much graphite dust as shown in FIG. 8 since diamines whose PDA proportions were too high were combined. Especially, in Comparative Example 2, the obtained graphite film generated much graphite dust because the graphite film was obtained by combining a diamine whose proportion of PDA was high (ODA/PDA ratio=25:75).

Examples 3, 4 and 6 to 9 and Comparative Example 2 were compared. In Examples 3, 4 and 6 to 9 and Comparative Example 2, graphite films having excellent flexibility were obtained since polyimide films (raw materials of the graphite films) had high birefringence. However, the graphite film obtained in Comparative Example 2 alone generated much graphite dust. In view of this, provided that polyimide films having high birefringences, which were produced from acid dianhydride and diamine, in which the acid dianhydride had a ratio of PMDA/BPDA in a range of 80:20 to 50:50 and the diamine had a ratio of ODA/PDA in a range of 30:70 to 90:10 were used, graphite films which generated low in graphite dust generation and had flexibility could be obtained.

Then, differences due to the differences in thicknesses of the polyimide films (raw materials of graphite films) in Examples and Comparative Examples were evaluated, respectively. There were few differences in results among Examples and Comparative Examples provided that thicknesses of respective polyimide films (raw materials of the graphite films) were 25 μm or 37 μm. In Example 4, evaluation on thickness dependencies of the polyimide films having thicknesses of 12.5 μm, 25 μm, 37 μm, 50 μm and 75 μm shows that the graphite films produced by the polyimide films having thicknesses of, especially 25 μm and 37 μm generated low in graphite dust and had flexibility.

Examples 2, 4 and Reference Examples 1 and 2 were compared. In Reference Examples 1 and 2, an electric furnace having effective heating volume of 1.5 L was used and graphite films having flexibility, which showed 10,000 or more times of folding, were obtained. On the other hand, in Examples 2 and 4, an electric furnace having effecting heating volume of 70 L was used, a graphite film obtained in especially Example 2 showed an extremely low flexibility. Accordingly, in a case where a polymer film having a thickness of 45 μm or less was heated in a heating furnace which had effective heating volume of 2 L or more, a problem that a graphite film having flexibility could not be obtained occurred. However, it is possible to obtain a flexible graphite film by altering a monomer ratio as described in the present invention to overcome the problem.

INDUSTRIAL APPLICABILITY

In accordance with the present invention, it is possible to obtain a graphite film which is low in graphite dust generation. Therefore, the graphite film can be utilized as materials for various electronics and electric devices such as, for example, heat-radiating components for semiconductor elements and other heat-generating components provided in a variety of electronics and electric devices such as computers.

REFERENCE SIGNS LIST

11: Being flexible
31: Graphite Sheet
32: Raw material film
71: Inner side of rolling
72: Outer side of rolling
81: 0 degree
82: 45 degree
83: 90 degree
84: 135 degree

The invention claimed is:

1. A process for producing a graphite film, the process comprising:
   providing a polyimide film that is the reaction product of (1) acid dianhydride having a molar ratio of PMDA/BPDA in a range of 80:20 to 50:50 and (2) diamine having a molar ratio of ODA/PDA in a range of 30:70 to 90:10;
   thermally treating the polyimide film at a temperature equal to or more than 2,600° C. to form a graphite film.

2. The process according to claim 1, wherein the (1) acid dianhydride has the molar ratio of PMDA/BPDA in a range of 70:30 to 60:40, and the (2) diamine has the molar ratio of ODA/PDA in a range of 40:60 to 85:15.

3. The process according to claim 1 wherein the polyimide film has a thickness that is in a range of 5 μm to 125 μm.

4. The process according to claim 2 wherein the polyimide film has a thickness that is in a range of 5 μm to 125 μm.

* * * * *